United States Patent
Kawasaki et al.

(10) Patent No.: US 9,580,779 B2
(45) Date of Patent: Feb. 28, 2017

(54) HIGH STRENGTH STEEL SHEET HAVING EXCELLENT FORMABILITY AND METHOD FOR MANUFACTURING THE SAME

(75) Inventors: Yoshiyasu Kawasaki, Chiba (JP); Hiroshi Hasegawa, Fukuyama (JP); Tatsuya Nakagaito, Chiba (JP); Shinjiro Kaneko, Chiba (JP); Yasunobu Nagataki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 6 days.

(21) Appl. No.: 14/342,550

(22) PCT Filed: Sep. 10, 2012

(86) PCT No.: PCT/JP2012/005706
§ 371 (c)(1),
(2), (4) Date: Mar. 4, 2014

(87) PCT Pub. No.: WO2013/038637
PCT Pub. Date: Mar. 21, 2013

(65) Prior Publication Data
US 2014/0230971 A1    Aug. 21, 2014

(30) Foreign Application Priority Data

Sep. 16, 2011 (JP) ................................. 2011-202752
Sep. 3, 2012 (JP) ................................. 2012-192756

(51) Int. Cl.
| | |
|---|---|
| *C22C 38/38* | (2006.01) |
| *C23C 2/02* | (2006.01) |
| *C23C 2/06* | (2006.01) |
| *C23C 2/28* | (2006.01) |
| *C21D 9/46* | (2006.01) |
| *C22C 38/00* | (2006.01) |
| *C22C 38/04* | (2006.01) |
| *C22C 38/58* | (2006.01) |
| *C22C 38/02* | (2006.01) |
| *C22C 38/06* | (2006.01) |
| *C22C 38/12* | (2006.01) |
| *C22C 38/14* | (2006.01) |
| *C21D 8/02* | (2006.01) |
| *C22C 38/08* | (2006.01) |

(Continued)

(52) U.S. Cl.
CPC ............ *C22C 38/38* (2013.01); *B32B 15/013* (2013.01); *C21D 8/0205* (2013.01); *C21D 8/0226* (2013.01); *C21D 8/0236* (2013.01); *C21D 8/0247* (2013.01); *C21D 8/0263* (2013.01); *C21D 9/46* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/24* (2013.01); *C22C 38/58* (2013.01); *C22C 38/60* (2013.01); *C23C 2/02* (2013.01); *C23C 2/06* (2013.01); *C23C 2/28* (2013.01); *C23C 2/40* (2013.01); *B21B 3/00* (2013.01); *B21B 2001/221* (2013.01); *B21B 2001/225* (2013.01); *B21B 2265/14* (2013.01); *C21D 2211/001* (2013.01); *C21D 2211/002* (2013.01); *C21D 2211/005* (2013.01); *C21D 2211/008* (2013.01)

(58) Field of Classification Search
CPC ....... C22C 38/001; C22C 38/02; C22C 38/04; C22C 38/12; C22C 38/14; C21D 8/0205; C21D 8/0247; C21D 9/46
See application file for complete search history.

(56) References Cited

U.S. PATENT DOCUMENTS

| | | | |
|---|---|---|---|
| 8,430,975 B2 * | 4/2013 | Nakagaito ................. | C21D 1/25 148/320 |
| 2009/0014098 A1 * | 1/2009 | Matsuda ............... | B32B 15/013 148/503 |

(Continued)

FOREIGN PATENT DOCUMENTS

| | | |
|---|---|---|
| EP | 2703512 | 3/2014 |
| JP | 1-259120 A | 10/1989 |

(Continued)

OTHER PUBLICATIONS

De Moor E., et al., "Austenite stabilization through manganese enrichment," Scripta Materialia, vol. 64, No. 2, Jan. 1, 2011, pp. 185-188.

(Continued)

*Primary Examiner* — Jessee Roe
*Assistant Examiner* — John Hevey
(74) *Attorney, Agent, or Firm* — RatnerPrestia

(57) ABSTRACT

A method for manufacturing the high strength steel sheet having excellent formability includes hot-rolling a steel slab having a chemical composition containing, by mass %, C: 0.03% or more and 0.35% or less, Si: 0.5% or more and 3.0% or less, Mn: 3.5% or more and 10.0% or less, P: 0.1% or less, S: 0.01% or less, N: 0.008% or less and the balance comprising Fe and inevitable impurities, coiling the hot-rolled steel sheet at a temperature range of the $Ar_1$ transformation point to the $Ar_1$ transformation point+(the $Ar_3$ transformation point−the $Ar_1$ transformation point)/2, cooling the coiled steel sheet down to 200° C. or lower, heating and holding the cooled steel sheet at a temperature range of the $Ac_1$ transformation point−200° C. to the $Ac_1$ transformation point for 30 minutes or more, pickling the heated steel sheet, cold-rolling the pickled steel sheet under the condition that the rolling reduction is 20% or more, and heating and holding the cold-rolled steel sheet at a temperature range of the $Ac_1$ transformation point to the $Ac_1$ transformation point+(the $Ac_3$ transformation point−the $Ac_1$ transformation point)/2 for 30 seconds or more.

20 Claims, No Drawings

(51) Int. Cl.
*C22C 38/24* (2006.01)
*C23C 2/40* (2006.01)
*B32B 15/01* (2006.01)
*C22C 38/16* (2006.01)
*C22C 38/60* (2006.01)
*B21B 3/00* (2006.01)
*B21B 1/22* (2006.01)

(56) References Cited

U.S. PATENT DOCUMENTS

| | | | |
|---|---|---|---|
| 2009/0223609 A1* | 9/2009 | Hakomori | C21D 6/002 148/602 |
| 2011/0139315 A1* | 6/2011 | Nakagaito | C21D 1/25 148/533 |
| 2013/0037180 A1* | 2/2013 | Sano | C21D 8/0436 148/603 |
| 2013/0133792 A1* | 5/2013 | Nakagaito | C21D 1/25 148/645 |
| 2014/0050941 A1* | 2/2014 | Kawasaki | C21D 9/46 428/653 |

FOREIGN PATENT DOCUMENTS

| | | | | |
|---|---|---|---|---|
| JP | | 05311323 | 11/1993 | |
| JP | | 7-188834 A | 7/1995 | |
| JP | | 2001-329340 A | 11/2001 | |
| JP | | 2001-355041 A | 12/2001 | |
| JP | | 2003-138345 A | 5/2003 | |
| JP | | 2010196115 | 9/2010 | |
| WO | WO 2009/096344 A1 | | 8/2009 | |
| WO | WO 2009/099079 A1 | | 8/2009 | |
| WO | WO 2011/093319 A1 | * | 8/2011 | ............ C22C 38/02 |
| WO | WO 2012/147898 A1 | | 11/2012 | |

OTHER PUBLICATIONS

European Search Report mailed Jun. 1, 2015 for European Application No. 12831286.5.

Gibbs, P.J. et al., "Austenite Stability Effects on Tensile Behavior of Manganese-Enriched-Austenite Transformation-Induced Plasticity Steel," Metallurgical and Materials Transactions A, vol. 42, No. 12, Apr. 27, 2011, pp. 3691-3702.

International Search Report dated Dec. 11, 2012, application No. PCT/JP2012/005706.

* cited by examiner

HIGH STRENGTH STEEL SHEET HAVING EXCELLENT FORMABILITY AND METHOD FOR MANUFACTURING THE SAME

FIELD OF THE INVENTION

The present invention relates to a high strength steel sheet having excellent formability which can be preferable as a member used in the fields of, for example, automobile industries and electric industries and a method for manufacturing the steel sheet.

BACKGROUND OF THE INVENTION

Nowadays, improvement of the fuel efficiency of automobiles is an important issue from the viewpoint of conservation of the global environment. Therefore, there is an active trend toward decreasing the weight of automobile bodies by increasing the strength of the material of automobile bodies so as to decrease the thickness of the material. However, since an increase in the strength of a steel sheet is accompanied by a decrease in the formability thereof, it is desired at present that a material having high strength and high formability be developed. For example, Patent Literature 1 discloses that a high strength-formability balance is achieved by performing heat treatment on high Mn steel under conditions for a ferrite-austenite dual phase. In addition, in Patent Literature 2, local ductility is improved by providing high Mn steel with a microstructure which is formed in such a way that a microstructure including bainite and martensite that is formed by hot rolling is changed by annealing and tempering so as to form fine retained austenite, and further by tempering so as to form tempered bainite or tempered martensite. However, in Patent Literature 1, since consideration is not given to improvement of formability by utilizing the concentration of Mn in untransformed austenite, there is a room for improvement of formability. In addition, in Patent Literature 2, since the microstructure includes a large amount of bainite or martensite which is tempered at a high temperature, it is difficult to achieve high strength, and, since the amount of retained austenite is limited in order to improve local ductility, there is an insufficient total elongation.

PATENT LITERATURE

PTL 1: Japanese Unexamined Patent Application Publication No. 1-259120
PTL 2: Japanese Unexamined Patent Application Publication No. 2003-138345

SUMMARY OF THE INVENTION

The present invention has been completed in view of the unresolved points described above, and the present invention aims to provide a high strength steel sheet having a TS (tensile strength) of 980 MPa or more and a TS (tensile strength)×EL (total elongation) of 24000 MPa·% or more and a method for manufacturing the high strength steel sheet.

The present inventors diligently conducted investigations, in order to manufacture a high strength steel sheet having excellent formability by solving the problem described above, from the viewpoint of a chemical composition and a manufacturing method of the steel sheet, and, as a result, found the followings.

That is, it was found that it is possible to manufacture a high strength steel sheet excellent in terms of formability having a TS of 980 MPa or more and a TS×EL of 24000 MPa·% or more by appropriately controlling a chemical composition of alloy elements, by coiling a hot-rolled steel sheet at a temperature range of the $Ar_1$ transformation point to the $Ar_1$ transformation point+(the $Ar_3$ transformation point−the $Ar_1$ transformation point)/2 after hot rolling, optionally further by holding the coiled steel sheet at a temperature range of the $Ar_1$ transformation point to the $Ar_1$ transformation point+(the $Ar_3$ transformation point−the $Ar_1$ transformation point)/2 for 5 hours or more, then by cooling the coiled steel sheet down to a temperature of 200° C. or lower, subsequently by heating and holding the cooled steel sheet at a temperature range of the $Ac_1$ transformation point−200° C. to the $Ac_1$ transformation point for 30 minutes or more, by pickling the heated steel sheet, then by cold-rolling the pickled steel sheet under the condition that the rolling reduction is 20% or more, then by holding the cold-rolled steel sheet at a temperature range of the $Ac_1$ transformation point to the $Ac_1$ transformation point+(the $Ac_3$ transformation point−the $Ac_1$ transformation point)/2 for 30 seconds or more, optionally further by cooling the cold-rolled steel sheet down to a temperature of 200° C. or lower, by heating and holding the cooled steel sheet at a temperature range of the $Ac_1$ transformation point to the $Ac_1$ transformation point+(the $Ac_3$ transformation point−the $Ac_1$ transformation point)/2 for 10 seconds or more, optionally further by performing hot-dip galvanizing treatment, and optionally further by performing alloying treatment on the galvanized layer at a temperature range of 470° C. to 600° C.

The present invention has been completed on the basis of the knowledge described above, and the subject matter of embodiments of the present invention is as follows.

(1) A method for manufacturing a high strength steel sheet having excellent formability, the method including hot-rolling a steel slab having a chemical composition containing, by massa, C: 0.03% or more and 0.35% or less, Si: 0.5% or more and 3.0% or less, Mn: 3.5% or more and 10.0% or less, P: 0.1% or less, S: 0.01% or less, N: 0.008% or less and the balance comprising Fe and inevitable impurities, coiling the hot-rolled steel sheet at a temperature range of the $Ar_1$ transformation point to the $Ar_1$ transformation point+(the $Ar_3$ transformation point−the $Ar_1$ transformation point)/2, cooling the coiled steel sheet down to 200° C. or lower, heating and holding the cooled steel sheet at a temperature range of the $Ac_1$ transformation point−200° C. to the $Ac_1$ transformation point for 30 minutes or more, pickling the heated steel sheet, cold-rolling the pickled steel sheet under the condition that the rolling reduction is 20% or more, and heating and holding the cold-rolled steel sheet at a temperature range of the $Ac_1$ transformation point to the $Ac_1$ transformation point+(the $Ac_3$ transformation point−the $Ac_1$ transformation point)/2 for 30 seconds or more.

(2) A method for manufacturing a high strength steel sheet having excellent formability, the method including hot-rolling a steel slab having a chemical composition containing, by mass %, C: 0.03% or more and 0.35% or less, Si: 0.5% or more and 3.0% or less, Mn: 3.5% or more and 10.0% or less, P: 0.1% or less, S: 0.01% or less, N: 0.008% or less and the balance comprising Fe and inevitable impurities, coiling the hot-rolled steel sheet at a temperature range of the $Ar_1$ transformation point to the $Ar_1$ transformation point+(the $Ar_3$ transformation point−the $Ar_1$ transformation point)/2, holding the coiled steel sheet at a temperature range of the $Ar_1$ transformation point to the $Ar_1$ transformation point+(the $Ar_3$ transformation point−the $Ar_1$ transformation point)/2 for 5 hours or more, cooling the coiled steel sheet down to 200° C. or lower, heating and holding the cooled steel sheet at a temperature range of the $Ac_1$ transformation point−200° C. to the $Ac_1$ transformation point for 30 minutes or more, pickling the heated steel sheet, cold-rolling the pickled steel sheet under the condition that the rolling reduction is 20% or more, and heating and holding the cold-rolled steel sheet at a temperature range of the $Ac_1$ transformation point to the $Ac_1$ transformation point+(the $Ac_3$ transformation point−the $Ac_1$ transformation point)/2 for 30 seconds or more.

(3) A method for manufacturing a high strength steel sheet having excellent formability, the method including hot-rolling a steel slab having a chemical composition containing, by mass %, C: 0.03% or more and 0.35% or less, Si: 0.5% or more and 3.0% or less, Mn: 3.5% or more and 10.0% or less, P: 0.1% or less, S: 0.01% or less, N: 0.008% or less and the balance comprising Fe and inevitable impurities, coiling the hot-rolled steel sheet at a temperature range of the $Ar_1$ transformation point to the $Ar_1$ transformation point+(the $Ar_3$ transformation point−the $Ar_1$ transformation point)/2, optionally further holding the coiled steel sheet at a temperature range of the $Ar_1$ transformation point to the $Ar_1$ transformation point+(the $Ar_3$ transformation point−the $Ar_1$ transformation point)/2 for 5 hours or more, cooling the coiled steel sheet down to 200° C. or lower, heating and holding the cooled steel sheet at a temperature range of the $Ac_1$ transformation point−200° C. to the $Ac_1$ transformation point for 30 minutes or more, pickling the heated steel sheet, cold-rolling the pickled steel sheet under the condition that the rolling reduction is 20% or more, heating and holding the cold-rolled steel sheet at a temperature range of the $Ac_1$ transformation point to the $Ac_1$ transformation point+(the $Ac_3$ transformation point−the $Ac_1$ transformation point)/2 for 30 seconds or more, cooling the heated steel sheet down to a temperature of 200° C. or lower, and heating and holding the cooled steel sheet at a temperature range of the $Ac_1$ transformation point to the $Ac_1$ transformation point+(the $Ac_3$ transformation point−the $Ac_1$ transformation point)/2 for 10 seconds or more.

(4) A method for manufacturing a high strength steel sheet having excellent formability, the method further including performing hot-dip galvanizing treatment on the high strength steel sheet manufactured by the method according to any one of items (1) to (3).

(5) The method for manufacturing a high strength steel sheet having excellent formability according to item (4), the method further including performing alloying treatment at a temperature range of 470° C. to 600° C. on the galvanized layer formed by the hot-dip galvanizing treatment.

(6) The method for manufacturing a high strength steel sheet having excellent formability according to any one of items (1) to (5), the steel slab having the chemical composition further containing, by massa, Al: 0.01% or more and 2.5% or less.

(7) The method for manufacturing a high strength steel sheet having excellent formability according to any one of items (1) to (6), the steel slab having the chemical composition further containing, by mass %, at least one chemical element selected from Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

(8) The method for manufacturing a high strength steel sheet having excellent formability according to any one of items (1) to (7), the steel slab having the chemical composition further containing, by mass %, at least one chemical element selected from Ti: 0.01% or more and 0.1% or less, Nb: 0.01% or more and 0.1% or less, and B: 0.0003% or more and 0.0050% or less.

(9) The method for manufacturing a high strength steel sheet having excellent formability according to any one of items (1) to (8), the steel slab having the chemical composition further containing, by massa, at least one chemical element selected from Ca: 0.001% or more and 0.005% or less and REM: 0.001% or more and 0.005% or less.

(10) The method for manufacturing a high strength steel sheet having excellent formability according to any one of items (1) to (9), the steel slab having the chemical composition further containing, by mass %, Mg: 0.0005% or more and 0.0100% or less.

(11) The method for manufacturing a high strength steel sheet having excellent formability according to any one of items (1) to (10), the steel slab having the chemical composition further containing, by mass %, Ta: 0.0010% or more and 0.1000% or less.

(12) The method for manufacturing a high strength steel sheet having excellent formability according to any one of items (1) to (11), the steel slab having the chemical composition further containing, by mass %, Sn: 0.0020% or more and 0.2000% or less and/or Sb: 0.0020% or more and 0.2000% or less.

(13) A high strength steel sheet having excellent formability, the steel sheet having a chemical composition containing, by mass %, C: 0.03% or more and 0.35% or less, Si: 0.5% or more and 3.0% or less, Mn: 3.5% or more and 10.0% or less, P: 0.1% or less, S: 0.01% or less, N: 0.008% or less and the balance comprising Fe and inevitable impurities and a microstructure including, in terms of area fraction, 30.0% or more of ferrite, in which the ratio of the amount of Mn (mass %) in the ferrite divided by the amount of Mn (mass %) in the steel sheet is 0.80 or less, and, in terms of volume fraction, 10.0% or more of retained austenite, in which the amount of Mn in the retained austenite is 6.0 mass % or more, and in which the average grain size of the retained austenite is 2.0 μm or less.

(14) The high strength steel sheet having excellent formability according to item (13), the steel sheet having a microstructure further including, in terms of area fraction, 3.0% or less of bainite, in which the aspect ratio of the retained austenite is 2.0 or less.

(15) The high strength steel sheet having excellent formability according to item (13) or (14), the steel sheet having the chemical composition further containing, by mass %, Al: 0.01% or more and 2.5% or less.

(16) The high strength steel sheet having excellent formability according to any one of items (13) to (15), the steel sheet having the chemical composition further containing, by mass %, at least one chemical element selected from Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

(17) The high strength steel sheet having excellent formability according to any one of items (13) to (16), the steel sheet having the chemical composition further containing, by mass %, at least one chemical element selected from Ti: 0.01% or more and 0.1% or less, Nb: 0.01% or more and 0.1% or less, and B: 0.0003% or more and 0.0050% or less.

(18) The high strength steel sheet having excellent formability according to any one of items (13) to (17), the steel sheet having the chemical composition further containing, by mass %, at least one chemical element selected from Ca: 0.001% or more and 0.005% or less and REM: 0.001% or more and 0.005% or less.

(19) The high strength steel sheet having excellent formability according to any one of items (13) to (18), the steel sheet having the chemical composition further containing, by mass %, Mg: 0.0005% or more and 0.0100% or less.

(20) The high strength steel sheet having excellent formability according to any one of items (13) to (19), the steel sheet having the chemical composition further containing, by massa, Ta: 0.0010% or more and 0.1000% or less.

(21) The high strength steel sheet having excellent formability according to any one of items (13) to (20), the steel sheet having the chemical composition further containing, by mass %, Sn: 0.0020% or more and 0.2000% or less and/or Sb: 0.0020% or more and 0.2000% or less.

Here, in the present specification, % used when describing a composition of a steel always represents massa. In addition, in the present invention, "a high strength steel sheet" means a steel sheet having a tensile strength TS of 980 MPa or more. Although, when referring in particular to a thin steel sheet, there is no particular limitation on thickness, the thickness of the steel sheet is normally about 0.7 mm to 3.6 mm.

According to the present invention, a high strength steel sheet excellent in terms of formability having a TS of 980 MPa or more and a TS×EL of 24000 MPa·% or more can be obtained. By applying the high strength steel sheet of the present invention, for example, to the structural parts of automobiles, it is expected to realize improvement of fuel efficiency due to a reduction of the weight of automobile bodies, which results in a large utility value in industry.

DETAILED DESCRIPTION OF EMBODIMENTS OF THE INVENTION

The present invention will be described in detail hereafter.

1) The reason why the chemical composition and the microstructure of the steel according to the present invention is limited to the preferred ranges described above will be described.

C: 0.03% or more and 0.35% or less

C is a chemical element which is necessary to form low-temperature transformed phases such as martensite in order to increase TS and which is effective for improving the formability of steel by stabilizing austenite in order to form retained austenite. In the case where the C content is less than 0.03%, it is difficult to achieve the desired TS. On the other hand, in the case where the C content is more than 0.35%, there is deterioration in the mechanical properties of a welded part due to a significant increase in the hardness of a welded part and a heat-affected zone, which results in deterioration in spot welding performance and arc welding performance. From these viewpoints, the C content is set to be 0.03% or more and 0.35% or less, preferably 0.05% or more and 0.20% or less.

Si: 0.5% or more and 3.0% or less

Si is a chemical element which increases the TS of steel by solid solution strengthening and which is effective for achieving good formability as a result of forming retained austenite and increasing the work hardenability of ferrite. In the case where the Si content is less than 0.5%, since the effect of adding Si is poor, the lower limit of the Si content is set to be 0.5%. However, in the case where the Si content is more than 3.0%, there is not only the embrittlement of steel but also deterioration in surface appearance quality due to, for example, the occurrence of red scale. Therefore, the Si content is set to be 0.5% or more and 3.0% or less, preferably 0.7% or more and 2.0% or less.

Mn: 3.5% or more and 10.0% or less

Mn is a chemical element which forms low-temperature transformed phases such as martensite, which increases the TS of steel by solid solution strengthening and which promotes the formation of retained austenite. These effects are recognized in the case where the Mn content is 3.5% or more. However, in the case where the Mn content is more than 10.0%, it is difficult to form desired amount of ferrite and ε martensite tends to be formed, which results in significant deterioration in formability. From these viewpoints, the Mn content is set to be 3.5% or more and 10.0% or less, preferably 3.8% or more and 7.0% or less.

P: 0.1% or less

Although P is a chemical element which is effective for increasing the strength of steel, there is embrittlement due to grain boundary segregation in the case where the P content is more than 0.1%, which results in deterioration in impact resistance. Therefore, the P content is set to be 0.1% or less.

S: 0.01% or less

Although, since S causes deterioration in stretch flangeability and impact resistance and the occurrence of a crack along a metal flow in a welded part as a result of forming inclusions such as MnS, it is preferable that the S content be as small as possible, the S content is set to be 0.01% or less from the viewpoint of manufacturing cost.

N: 0.008% or less

Since N is the chemical element which most significantly deteriorates the aging resistance of steel, it is preferable that the N content be as small as possible. Deterioration in aging resistance is significant in the case where the N content is more than 0.008%. Therefore, the N content is set to be 0.008% or less.

Although the balance consists of Fe and inevitable impurities, one or more of the chemical elements described below may be appropriately added as needed.

Al: 0.01% or more and 2.5% or less

Al is a chemical element which is effective for suppressing the formation of carbides and for forming retained austenite. In addition, since Al is effective for increasing the cleanliness of steel as a result of functioning as a deoxidation agent, it is preferable that Al be added in a deoxidation process. In the case where the Al content is less than 0.01%, since these effects of adding Al are poor, the lower limit of the Al content is set to be 0.01%. However, in the case where the Al content is more than 2.5%, there is an increased risk of slab fracture occurring when continuous casting is performed, which results in a decrease in productivity. From these viewpoints, the Al content is set to be 0.01% or more and 2.5% or less, preferably 0.2% or more and 1.5% or less.

At least one chemical element selected from Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less Since Cr, V and Mo are effective for improving strength-ductility balance, these chemical elements may be added as needed. This effect is realized in the case where Cr: 0.05% or more, V: 0.005% or more and Mo: 0.005% or more. However, in the case where Cr: more than 1.0%, V: more than 0.5% or Mo: more than 0.5%, the fraction of a second phase becomes excessively large, which results in there being a concern that there may be, for example, a decrease in ductility due to a significant increase in strength, and which also results in an increase in cost. Therefore, in the case where these chemical elements are added, the Cr content is set to be 0.05% or more and 1.0% or less, the V content is set to be 0.005% or more and 0.5% or less, and the Mo content is set to be 0.005% or more and 0.5% or less.

Since Ni and Cu are chemical elements which are effective for increasing the strength of steel, these chemical elements may be added in order to increase the strength of steel as long as their contents are within the ranges according to the present invention. In order to realize this effect, it is necessary that each of the Ni and Cu contents be 0.05% or more. On the other hand, in the case where the Ni content or the Cu content is more than 1.0%, there is a decrease in the ductility of steel and there is also an increase in cost. Therefore, in the case where Ni and Cu are added, each of the Ni and Cu contents is set to be 0.05% or more and 1.0% or less.

At least one chemical element selected from Ti: 0.01% or more and 0.1% or less, Nb: 0.01% or more and 0.1% or less, and B: 0.0003% or more and 0.0050% or less Ti and Nb are effective for the precipitation strengthening of steel. This effect is realized in the case where each of the Ti and Nb contents is 0.01% or more. However, in the case where each of the Ti and Nb content exceeds 0.1%, there is a decrease in ductility and shape fixability and there is also an increase in cost. Therefore, in the case where Ti and Nb are added, the Ti content is set to be 0.01% or more and 0.1% or less and the Nb content is set to be 0.01% or more and 0.1% or less.

Since B is effective for suppressing the formation and growth of ferrite from the grain boundaries of austenite, B may be added as needed. This effect is realized in the case where the B content is 0.0003% or more. However, in the case where the B content is more than 0.0050%, there is a decrease in formability and there is also an increase in cost. Therefore, in the case where B is added, the B content is set to be 0.0003% or more and 0.0050% or less.

At least one chemical element selected from Ca: 0.001% or more and 0.005% or less and REM: 0.001% or more and 0.005% or less Ca and REM are chemical elements which are effective for decreasing the negative effect of sulfides on stretch flangeability as a result of spheroidizing the shape of sulfides. In order to realize this effect, it is necessary that each of the Ca and REM contents be 0.001% or more. However, in the case where each of the Ca and REM contents is more than 0.005%, there is the occurrence of surface and internal defects due to an increase in the amount of, for example, inclusions. Therefore, in the case where Ca and REM are added, each of the Ca and REM contents is set to be 0.001% or more and 0.005% or less.

Mg: 0.0005% or more and 0.0100% or less

Mg is a chemical element which is used for deoxidation and which is effective for decreasing the negative effect of sulfides on stretch flangeability and local ductility as a result of spheroidizing the shape of sulfides as Ca and REM do. In order to realize this effect, it is necessary that the Mg content be 0.0005% or more. However, in the case where the Mg content is more than 0.0100%, there are defects such as surface defects and internal defects due to an increase in the amount of, for example, inclusions. Therefore, in the case where Mg is added, the Mg content is set to be 0.0005% or more and 0.0100% or less.

Ta: 0.0010% or more and 0.1000% or less

Ta contributes to increasing strength as a result of forming alloy carbides and alloy carbo-nitrides as Ti and Nb do. In addition, it is considered that Ta is effective for stabilizing contribution to precipitation strengthening by significantly suppressing an increase in the size of precipitates as a result of partially forming a solid solution with Nb carbides and Nb carbo-nitrides and forming complex precipitates such as (Nb, Ta)(C, N). Therefore, it is preferable that Ta be added. Here, the effect of stabilizing precipitates described above is realized in the case where the Ta content is 0.0010% or more. On the other hand, in the case where the Ta content is excessively large, the effect of stabilizing precipitates become saturated and there is an increase in cost. Therefore, in the case where Ta is added, the Ta content is set to be 0.0010% or more and 0.1000% or less.

Sn: 0.0020% or more and 0.2000% or less and/or Sb: 0.0020% or more and 0.2000% or less It is preferable that at least one chemical element selected from Sn and Sb be added in an amount described below. That is to say, Sn and/or Sb are added as needed in order to suppress decarburization in a region of the surface layer of a steel sheet, having a thickness of about several tens of μm which is caused by nitridation and oxidation of the surface of the steel sheet. Since, by adding Sn and Sb in an amount of 0.0020% each, nitridation and oxidation described above are suppressed, a decrease in the amount of a martensite, which is formed on the surface of a steel sheet, is prevented, which results in improvement of fatigue resistance and aging resistance. On the other hand, in the case where any of these chemical elements is added in an amount of more than 0.2000%, there is a decrease in toughness. Therefore, in the case where Sn and/or Sb are added, each of the Sn and Sb content is set to be 0.0020% or more and 0.2000% or less.

The area fraction of ferrite: 30.0% or more

It is difficult to achieve good ductility in the case where the area fraction of ferrite is less than 30.0%. Therefore, the area fraction of ferrite is set to be 30.0% or more. In the case where the area fraction of ferrite is excessively large, since it is difficult to achieve the desired strength, it is preferable that the area fraction of ferrite be 80.0% or less. Here, the area fraction of ferrite can be derived by calculating the average of ten values of area fraction of ferrite which are calculated using Image-Pro (image analysis software), manufactured by Media Cybernetics, Inc., from the microstructure photographs which are taken using an SEM (scanning electron microscope) at a magnification of 3000 times in 10 microscopic fields at a position of ¼ of the thickness (position located at ¼ of the thickness of the steel sheet from the surface of the steel sheet) of each sample which is prepared by polishing and etching, using a 3% nital solution, a cross section in the thickness direction which is parallel to the rolling direction of the steel sheet (L cross section). In addition, in the microstructure photograph, ferrite is observed as a gray colored microstructure.

The ratio of the amount of Mn (mass %) in ferrite divided by the amount of Mn (mass %) in a steel sheet: 0.80 or less In the case where the amount of Mn (mass %) in ferrite is more than 0.80 part of the amount of Mn (mass %) in a steel sheet, since there is a decrease in the ductility of ferrite, it is difficult to achieve the desired ductility of the steel sheet. Therefore, the amount of Mn (mass %) in ferrite is set to be not more than 0.80 part of the amount of Mn (mass %) in a steel sheet. In the case where the ratio of the amount of Mn (mass %) in ferrite divided by the amount of Mn (mass %) in a steel sheet is excessively small, since it may be difficult to achieve sufficient strength for the crystal grains of ferrite, it is preferable that the ratio be 0.20 or more.

Here, the amount of Mn in ferrite can be derived by calculating the average value of the results of analysis on the amounts of Mn in 30 grains of ferrite which are obtained by determining the distributions of Mn in all phases in a cross section in the rolling direction at a position of ¼ of the thickness using a field emission-electron probe micro analyzer. The amount of Mn in a steel sheet can be derived using an optical emission spectroscopy method (QV analysis).

The volume fraction of retained austenite: 10.0% or more

Retained austenite effectively functions to increase ductility, and, in the case where the volume fraction of retained austenite is less than 10.0%, it is impossible to achieve the desired ductility and there is also a concern that there may be a decrease in deep drawability. Therefore, the volume fraction of retained austenite is set to be 10.0% or more. Although there is no particular limitation on the upper limit of the volume fraction of retained austenite, the upper limit is 40.0% in the case of the range of the present chemical composition.

Here, the volume fraction of retained austenite can be derived using the intensity of a diffracted X-ray at a surface at ¼ of the thickness which is exposed by polishing the steel sheet to a position at ¼ of the thickness. The volume fraction of retained austenite can be obtained, using a MoKα ray as an incident X-ray, by calculating the average value of the intensity ratios for all the combinations of integrated intensities of the peaks of {111}, {200}, {220}, and {311} planes of a retained austenite phase and {110}, {200} and {211} planes of ferrite.

The amount of Mn in retained austenite: 6.0 mass % or more

The present invention is characterized in that an effect of stabilizing austenite through the use of Mn is preferably utilized in order to achieve the volume fraction of retained austenite of 10.0% or more. That is to say, it is possible to achieve stable retained austenite due to an increase in the amount of Mn in austenite, which results in significant improvement of ductility and deep drawability. In order to realize this effect, the amount of Mn in retained austenite is set to be 6.0 mass % or more. It is preferable that the amount of Mn in retained austenite be 11.0 mass % or less, because a retained austenite becomes excessively stable in the case where the amount of Mn in retained austenite is excessively large, which results in there being a concern that retained austenite may be retained even after deformation is applied by a tensile test, that is, there being a concern that sufficient ductility cannot be achieved due to a TRIP effect, in which retained austenite is transformed into martensite, being realized to a lesser degree.

Here, the amount of Mn in retained austenite can be derived by calculating the average value of the results of analysis on the amounts of Mn in 30 grains of retained austenite which are obtained by determining the distributions of Mn in all phases in a cross section in the rolling direction at a position of ¼ of the thickness using a field emission-electron probe micro analyzer.

The average grain size of retained austenite: 2.0 µm or less

In the case where the average grain size of retained austenite is more than 2.0 µm, there is a decrease in the stability of retained austenite, which results in it being difficult to achieve the desired ductility, which results in a disadvantage from the viewpoint of achieving good deep drawability, and which results in there being a concern that it may be difficult to achieve good bendability and fatigue resistance because the propagation of a crack in a steel sheet cannot be suppressed during a bend test and a fatigue test. Therefore, the average grain size of retained austenite is set to be 2.0 µm or less. In the case where the average grain size of retained austenite is less than 0.1 µm, since there is a decrease in effect of increasing a work hardening ratio due to a TRIP effect, which results in a concern that sufficient ductility cannot be achieved, it is preferable that the average grain size of retained austenite be 0.1 µm or more. Here, the average grain size of retained austenite can be derived from the observation of 20 retained austenite grains using a TEM (transmission electron microscope) by averaging values of equivalent circle diameters calculated from the areas of the 20 retained austenite grains which are determined by using Image-Pro described above.

The area fraction of bainite: 3.0% or less

The present invention is characterized in that it is possible to achieve the desired volume fraction of stable retained austenite without utilizing bainite transformation. In addition, a dislocation density is comparatively larger in bainite than in ferrite. Therefore, the ductility of bainite is low, and there is a concern that it may be difficult to achieve the desired ductility of a steel sheet in the case where the area fraction of bainite is more than 3.0%. Therefore, it is preferable that the area fraction of bainite be 3.0% or less. The area fraction of bainite may be 0.0%.

In addition, here, "the area fraction of a bainite" means the ratio of an area which is occupied by bainitic ferrite (ferrite which is formed by bainite transformation and in which a dislocation density is comparatively high) with respect to the observed area.

The aspect ratio of retained austenite: 2.0 or less

In the case where the aspect ratio of retained austenite is more than 2.0, the propagation of a crack in a steel sheet cannot be suppressed in a bend test and a fatigue test because a crack grows at an interface between elongated retained austenite (hard phase) which are present along grain boundaries of ferrite and ferrite (soft phase), which results in it being difficult to achieve good bendability and fatigue resistance. Therefore, the aspect ratio of retained austenite is set to be 2.0 or less.

In addition, here, "the aspect ratio of retained austenite" means the ratio of the length of the major axis of a crystal grain of retained austenite divided by the length of the minor axis thereof.

Here, the area fraction of bainite and the aspect ratio (the length of the major axis/the length of the minor axis) of retained austenite can be derived by calculating each of the averages of ten values of area fraction of bainite and the aspect ratio (the length of the major axis/the length of the minor axis) of retained austenite which are calculated using Image-Pro, manufactured by Media Cybernetics, Inc., from the microstructure photographs which are taken using an SEM at a magnification of 3000 times in 10 microscopic fields at a position of ¼ of the thickness (position located at ¼ of the thickness of the steel sheet from the surface of the steel sheet) of each sample which is prepared by polishing and etching, using a 3% nital solution, a cross section which is parallel to the rolling direction of the steel sheet (L cross section).

In addition, there is not a decrease in the effect of the present invention even if the microstructure according to the present invention includes one or more of martensite, tempered martensite, pearlite and carbides such as cementite as a balance of the microstructure other than ferrite, bainite and retained austenite. However, it is preferable that the area fraction of pearlite be 5% or less in order to achieve good ductility.

2) Secondly, manufacturing conditions will be described.
<Casting Conditions>

Steel having the chemical composition described above is produced by melting and made into a steel slab. Although it is preferable that the slab is manufactured using a continuous casting method in order to prevent the macro segregation of the components, an ingot-making method or a thin slab casting method may be used. In addition, there is no problem in applying energy saving processes such as hot direct rolling or direct rolling in which a hot steel slab is charged to a reheating furnace without cooling the slab down to room temperature or in which a hot steel slab is directly rolled immediately after being held in a heat-retaining state for a short duration, in addition to a conventional method in which a slab is manufactured, cooled down to room temperature once and then reheated.

<Hot Rolling Conditions>

The steel slab is hot-rolled and coiled. In the case where a slab reheating temperature is lower than 1100° C., it is difficult to achieve sufficient amount of a solid solution of carbides and there are problems, for example, in that there is an increased risk of troubles occurring due to an increase in rolling load when hot rolling is performed. Therefore, it is preferable that the slab reheating temperature be 1100° C. or higher. In addition, it is preferable that the slab reheating temperature be 1300° C. or lower in order to prevent, for example, an increase in scale loss due to an increase in the amount of oxidation. Incidentally, a so-called sheet bar heater, which is used for heating a sheet bar, may be utilized in order to prevent troubles when hot rolling is performed in the case where a slab temperature is low. In the case where a finish rolling temperature is lower than the $Ar_3$ transformation point, a decrease in formability may be caused due to the occurrence of anisotropic material properties. Therefore, it is preferable that the finish rolling temperature be equal to or higher than the $Ar_3$ transformation point.

Coiling temperature: from the $Ar_1$ transformation point to the $Ar_1$ transformation point+(the $Ar_3$ transformation point−the $Ar_1$ transformation point)/2

A coiling temperature after hot rolling has been performed is very important in the present invention. Since, by coiling the hot-rolled steel sheet at the coiling temperature described above, there is the concentration of Mn in austenite, sufficient Mn concentration is achieved in austenite when heat treatment is performed after cold rolling has been performed, which results in improvement of formability because a stable retained austenite is achieved. In the case where the coiling temperature is lower than the $Ar_1$ transformation point or higher than $Ar_1$ transformation point+(the $Ar_3$ transformation point−the $Ar_1$ transformation point)/2, since the concentration of Mn in austenite does not progress, Mn concentration is small when heat treatment is performed after cold rolling has been performed, which results in it being difficult to achieve good formability.

Holding the coiled steel sheet at a temperature range of the $Ar_1$ transformation point to the $Ar_1$ transformation point+ (the $Ar_3$ transformation point−the $Ar_1$ transformation point)/2 for 5 hours or more Since, by holding the coiled steel sheet at a temperature range of the $Ar_1$ transformation point to the $Ar_1$ transformation point+(the $Ar_3$ transformation point−the $Ar_1$ transformation point)/2 for 5 hours or more, there is further concentration of Mn in austenite, there is an increase in Mn concentration in austenite when heat treatment is performed after cold rolling has been performed, which results in further improvement of formability because more stable retained austenite is achieved. Therefore, it is preferable to hold the steel sheet, which has been coiled at the temperature described above, at the temperature range described above for 5 hours or more. In addition, it is preferable that the duration of holding be 12 hours or less, because there is a decrease in the strength of a steel sheet annealed after cold rolling has been performed due to excessive coarsening of the crystal grains of a hot-rolled steel sheet.

Incidentally, in the hot rolling process according to the present invention, lubricated rolling may be applied to all or part of the finish rolling in order to decrease the rolling load of hot rolling. It is also effective to apply lubricated rolling from the viewpoint of uniformity of shape and homogenization of material qualities. Incidentally, it is preferable that the friction coefficient of lubricated rolling be within the range of 0.25 or less and 0.10 or more. In addition, it is preferable to utilize continuous rolling process, in which consecutive sheet bars are joined and continuously subjected to finish rolling. It is also preferable to utilize continuous rolling process from the viewpoint of the operation stability of hot rolling.

Cooling the coiled steel sheet down to 200° C. or lower, and then heating and holding the cooled steel sheet at a temperature range of the $Ac_1$ transformation point−200° C. to the $Ac_1$ transformation point for 30 minutes or more.

The steel sheet which has been coiled at a temperature range of the $Ar_1$ transformation point to the $Ar_1$ transformation point+(the $Ar_3$ transformation point−the $Ar_1$ transformation point)/2, and which has been optionally further held at a temperature range of the $Ar_1$ transformation point to the $Ar_1$ transformation point+(the $Ar_3$ transformation point−the $Ar_1$ transformation point)/2 for 5 hours or more, is cooled down to a temperature of 200° C. or lower. By cooling the steel sheet down to a temperature of 200° C. or lower, hard low-temperature transformed phases such as martensite and bainite can be formed. There is no particular limitation on a cooling method or a cooling rate when cooling is performed.

Since, by holding the hard low-temperature transformed phases such as martensite and bainite, which have been formed by cooling down to a temperature of 200° C. or lower, at a temperature range of the $Ac_1$ transformation point−200° C. to the $Ac_1$ transformation point for 30 minutes or more, carbides such as cementite are formed as a result of these phases being transformed into tempered martensite and tempered bainite, austenite having high C content and a small grain size is formed when heat treatment is performed after cold rolling has been performed, which results in improvement of formability. In addition, there is an effect of softening the hot-rolled steel sheet and decreasing the rolling load of cold rolling which is performed afterwards. In the case of holding at a temperature of lower than the $Ac_1$ transformation point−200° C. or higher than the $Ac_1$ transformation point or in the case of holding for less than 30 minutes, it is difficult to realize the effects described above. In the case where the duration is more than 750 minutes, since crystal grains become excessively large, it is impossible to finally achieve the desired average grain size of retained austenite, ductility may be decreased, there is a concern that there may be a decrease in deep drawability and there may be an increase in cost due to the consumption of a large amount of energy. Therefore, it is preferable that the duration be 750 minutes or less.

After holding the steel sheet at a temperature range of the $Ac_1$ transformation point−200° C. to the $Ac_1$ transformation point for 30 minutes or more, cooling is performed and then pickling is performed. There is no particular limitation on a cooling method or cooling rate when cooling is performed. Pickling may be performed by a common method.

The rolling reduction of cold rolling: 20% or more

Cold rolling is performed after pickling has been performed. The rolling reduction of cold rolling after hot rolling has been performed is very important in the present invention. Since, by performing cold rolling under the condition that the rolling reduction is 20% or more, the recrystallization of ferrite is promoted when heat treatment is performed afterwards, recrystallized ferrite having a small grain size and good ductility is formed, which results in improvement of formability. In addition, since austenite having a small grain size is formed as a result of the formation of ferrite having a small grain size, more stable retained austenite is formed, which results in an increase in TS×EL.

<Heat Treatment Conditions after Cold Rolling has been Performed>

Holding the cold rolled steel sheet at a temperature range of the $Ac_1$ transformation point to the $Ac_1$ transformation point+(the $Ac_3$ transformation point–the $Ac_1$ transformation point)/2 for 30 seconds or more(heat treatment 1)

In the case where heat treatment (annealing treatment) is performed under conditions for a dual phase of austenite and ferrite, there is the concentration of Mn in austenite, the Mn content in austenite becomes larger than the average Mn content of the steel. In the case where a heat treatment temperature is lower than the $Ac_1$ transformation point, since austenite is hardly formed, the desired retained austenite is not formed after annealing has been performed, which results in a decrease in formability. In addition, in the case where a heat treatment temperature is higher than the $Ac_1$ transformation point+(the $Ac_3$ transformation point–the $Ac_1$ transformation point)/2, since the concentration of Mn in austenite is insufficient when the heat treatment is performed, a stable retained austenite cannot be achieved, which results in a decrease in formability. In addition, in the case where the duration is less than 30 seconds, since the concentration of Mn in austenite is insufficient when heat treatment is performed, a stable retained austenite cannot be achieved, which results in a decrease in formability. Further, a large amount of non-recrystallized microstructure is retained, which also results in a decrease in formability. Therefore, heat treatment is set to be performed under the conditions that the heat treatment temperature range is from the $Ac_1$ transformation point to the $Ac_1$ transformation point+(the $Ac_3$ transformation point–the $Ac_1$ transformation point)/2 and the duration is 30 seconds or more. In the case where the duration is more than 360 minutes, since there is an excessive increase in the grain sizes of ferrite and austenite during heat treatment, the desired average grain size of retained austenite cannot be achieved, which may cause a decrease in ductility, and further, which results in there being a concern that there may be a decrease in deep drawability. An increase in cost due to the consumption of a large amount of energy may also be caused. Therefore, it is preferable that the duration be 360 minutes or less.

Incidentally, any one of a continuous annealing method and a batch annealing method may be utilized as a heat treatment method. In addition, there is no particular limitation on cooling method or cooling rate when cooling down to room temperature is performed after the heat treatment described above has been performed, and any one of cooling methods such as furnace cooling and air cooling in batch annealing, gas jet cooling, mist cooling and water cooling in continuous annealing may be used.

In addition, after the heat treatment described above has been performed, cooling down to 200° C. may be performed and then the heat treatment described below may be performed.

Holding the steel sheet at a temperature range of the $Ac_1$ transformation point to the $Ac_1$ transformation point+(the $Ac_3$ transformation point–the $Ac_1$ transformation point)/2 for 10 seconds or more (heat treatment 2)

Moreover, since, by performing heat treatment under the conditions described above, the concentration of Mn in austenite progresses, it is possible to achieve more stable retained austenite, which results in further improvement of formability. In the case where the heat treatment temperature is lower than the $Ac_1$ transformation point or higher than the $Ac_1$ transformation point+(the $Ac_3$ transformation point–the $Ac_1$ transformation point)/2 or in the case where the duration is less than 10 seconds, the effect described above cannot be realized. There is no limitation on a cooling method or a cooling rate when cooling down to room temperature is performed after the heat treatment described above has been performed. In the case where the duration is more than 180 minutes, since there is an excessive increase in the grain sizes of ferrite and austenite during heat treatment, the desired average grain size of retained austenite cannot be achieved, which may cause a decrease in ductility, and which also is not preferable from the viewpoint of deep drawability. There may be an increase in cost due to the consumption of a large amount of energy. Therefore, it is preferable that the duration be 180 minutes or less.

<Hot-Dip Galvanizing Treatment>

In the case where hot-dip galvanizing treatment is performed, the steel sheet which has been subjected to heat treatment 1 or heat treatment 2 described above is dipped in a galvanizing bath at a temperature of 440° C. or higher and 500° C. or lower and subjected to hot-dip galvanizing treatment, and then coating weight is controlled, for example, by a gas wiping method. It is preferable that a galvanizing bath, in which the Al content is 0.08 mass % or more and 0.18 mass % or less, be used for hot-dip galvanizing treatment.

<Alloying Treatment of a Galvanized Layer>

In the case where alloying treatment of a galvanized layer is performed, alloying treatment of a galvanized layer is performed at a temperature of 470° C. or higher and 600° C. or lower after hot-dip galvanizing treatment has been performed. In the case of a temperature of lower than 470° C., since alloying of the galvanized layer is not promoted, it is difficult to obtain a galvannealed steel sheet. In the case where alloying treatment is performed at a temperature of higher than 600° C., since there is the decomposition of retained austenite, there is a decrease in formability. Therefore, in the case where alloying treatment of a galvanized layer is performed, alloying treatment of a galvanized layer is to be performed at a temperature range of 470° C. to 600° C.

Skin pass rolling may be performed on a cold-rolled steel sheet, which is not subjected to galvanizing treatment, and a steel sheet, which has been subjected to galvanizing treatment or alloying treatment of a galvanized layer, for the purpose of, for example, shape correction and the control of surface roughness. In addition, various coating treatments such as resin coating and oil coating may also be performed.

EXAMPLES

Steels having the chemical compositions given in Table 1 with the balance being Fe and inevitable impurities were produced by a converter and cast into slabs by using a continuous casting method. The obtained slabs were reheated up to a temperature of 1250° C., hot-rolled to make a steel sheet having a thickness of 4.0 mm under the condition that finish rolling temperature was 870° C., coiled, cooled down to a temperature of 200° C. or lower after being coiled or after being held at the coiling temperature for specified durations after being coiled, then subjected to heat treatment (heat treatment of a hot-rolled steel sheet), pickled, cold-rolled and subjected to heat treatment. Further, some of the steel sheets were subjected to hot-dip galvanizing treatment, and optionally, further subjected to alloying treatment of a galvanized layer. The temperature of the galvanizing bath was 460° C. The zinc coating weight was controlled to be 45 g/m² per side (double-sided plating) and alloying treatment was performed so that the Fe content in the coating layer was 9 mass % or more and 12 mass % or less. The manufacturing conditions are given in Table 2. The tensile properties of the obtained steel sheets were investigated and the results of the investigation are given in Tables 3A and 3B.

TABLE 1

| Steel Grade | Chemical Composition (mass %) | | | | | | | | Ar₁ Transformation Point (° C.) |
|---|---|---|---|---|---|---|---|---|---|
| | C | Si | Mn | Al | P | S | N | Others | |
| A | 0.102 | 1.04 | 4.52 | 0.028 | 0.026 | 0.0022 | 0.0038 | — | 569 |
| B | 0.062 | 1.45 | 5.18 | 0.032 | 0.029 | 0.0024 | 0.0034 | — | 559 |
| C | 0.294 | 0.72 | 4.82 | 0.026 | 0.023 | 0.0024 | 0.0036 | — | 528 |
| D | 0.102 | 0.98 | 6.11 | 0.032 | 0.024 | 0.0026 | 0.0032 | — | 504 |
| E | 0.012 | 1.51 | 5.32 | 0.030 | 0.027 | 0.0019 | 0.0030 | — | 560 |
| F | 0.101 | 1.21 | 11.4 | 0.029 | 0.029 | 0.0021 | 0.0030 | — | 299 |
| G | 0.144 | 1.43 | 2.89 | 0.030 | 0.028 | 0.0028 | 0.0030 | — | 641 |
| H | 0.110 | 1.01 | 4.82 | 0.723 | 0.031 | 0.0022 | 0.0031 | — | 555 |
| I | 0.092 | 1.05 | 5.03 | 0.034 | 0.024 | 0.0026 | 0.0032 | Ni: 0.22, Cu: 0.19 | 541 |
| J | 0.124 | 1.29 | 4.98 | 0.028 | 0.028 | 0.0028 | 0.0030 | Cr: 0.21, V: 0.062 | 551 |
| K | 0.089 | 1.51 | 5.55 | 0.032 | 0.025 | 0.0024 | 0.0031 | Mo: 0.21 | 539 |
| L | 0.085 | 1.14 | 5.56 | 0.033 | 0.024 | 0.0019 | 0.0033 | Nb: 0.028 | 532 |
| M | 0.151 | 1.32 | 5.22 | 0.027 | 0.029 | 0.0020 | 0.0034 | Ti: 0.021, B: 0.0019 | 544 |
| N | 0.121 | 1.18 | 4.98 | 0.030 | 0.024 | 0.0018 | 0.0029 | Ca: 0.0015, REM: 0.0018 | 553 |
| O | 0.128 | 0.72 | 4.14 | 0.340 | 0.019 | 0.0024 | 0.0044 | — | 572 |
| P | 0.094 | 0.75 | 5.22 | 0.034 | 0.024 | 0.0017 | 0.0036 | Mg: 0.0021 | 533 |
| Q | 0.088 | 0.56 | 5.14 | 0.036 | 0.024 | 0.0022 | 0.0031 | Ta: 0.0071 | 532 |
| R | 0.101 | 0.66 | 4.89 | 0.030 | 0.019 | 0.0031 | 0.0041 | Nb: 0.018, Ta: 0.0064 | 543 |
| S | 0.114 | 0.78 | 5.49 | 0.027 | 0.022 | 0.0018 | 0.0042 | Sn: 0.0061 | 521 |
| T | 0.089 | 0.81 | 6.12 | 0.029 | 0.016 | 0.0021 | 0.0036 | Nb: 0.019, Sn: 0.0057 | 500 |
| U | 0.146 | 0.73 | 3.89 | 0.032 | 0.024 | 0.0026 | 0.0032 | Sb: 0.0069 | 581 |
| V | 0.122 | 0.74 | 4.88 | 0.043 | 0.021 | 0.0023 | 0.0040 | Nb: 0.021, Sb: 0.0052 | 544 |

| Steel Grade | Ar₃ Transformation Point (° C.) | Ac₁ Transformation Point (° C.) | Ac₃ Transformation Point (° C.) | Note |
|---|---|---|---|---|
| A | 728 | 634 | 762 | Example |
| B | 731 | 621 | 776 | Example |
| C | 640 | 619 | 693 | Example |
| D | 662 | 589 | 712 | Example |
| E | 744 | 618 | 802 | Comparative Example |
| F | 459 | 443 | 564 | Comparative Example |
| G | 795 | 684 | 817 | Comparative Example |
| H | 712 | 625 | 888 | Example |
| I | 699 | 616 | 744 | Example |
| J | 707 | 626 | 762 | Example |
| K | 703 | 612 | 764 | Example |
| L | 695 | 607 | 742 | Example |
| M | 695 | 617 | 748 | Example |
| N | 709 | 623 | 749 | Example |
| O | 721 | 641 | 814 | Example |
| P | 691 | 612 | 732 | Example |
| Q | 688 | 612 | 728 | Example |
| R | 698 | 620 | 734 | Example |
| S | 674 | 604 | 717 | Example |
| T | 659 | 587 | 708 | Example |
| U | 726 | 648 | 755 | Example |
| V | 695 | 621 | 735 | Example |

The $Ar_1$ transformation point, the $Ar_3$ transformation point, the $Ac_1$ transformation point and the $Ac_3$ transformation point were derived using the following equations:

$Ar_1$ transformation point(° C.)=730−102×(% C)+29×(% Si)−40×(% Mn)−18×(% Ni)−28×(% Cu)−20×(% Cr)−18×(% Mo), $Ar_3$ transformation point(° C.)=900−326×(% C)+40×(% Si)−40×(% Mn)−36×(% Ni)−21×(% Cu)−25×(% Cr)−30×(% Mo), $Ac_1$ transformation point(° C.)=751−16×(% C)+11×(% Si)−28×(% Mn)−5.5×(% Cu)−16×(% Ni)+13×(% Cr)+3.4×(% Mo), $Ac_3$ transformation point(° C.)=910−203√(% C)+45×(% Si)−30×(% Mn)−20×(% Cu)−15×(% Ni)+11×(% Cr)+32×(% Mo)+104×(% V)+400×(% Ti)+200×(% Al), where (% C), (% Si), (% Mn), (% Ni), (% Cu), (% Cr), (% Mo), (% V), (% Ti), (% Al) respectively represent the contents (mass %) of the corresponding chemical elements.

TABLE 2

| No. | Steel Grade | Coiling Temperature °C. | Duration at Coiling Temperature min. | Heat Treatment after Hot Rolling Temperature °C. | Duration min. | Cold Rolling Reduction % | Heat Treatment after Cold Rolling 1 Temperature °C. | Durations |
|---|---|---|---|---|---|---|---|---|
| 1 | A | 600 | — | 550 | 120 | 40 | 650 | 200 |
| 2 | A | 600 | — | 550 | 120 | 40 | 650 | 200 |
| 3 | A | 600 | — | 550 | 120 | 40 | 650 | 200 |
| 4 | A | 600 | 360 | 550 | 120 | 40 | 650 | 200 |
| 5 | A | 600 | 360 | 550 | 120 | 40 | 650 | 200 |
| 6 | A | 600 | — | 550 | 120 | 65 | 650 | 200 |
| 7 | A | 600 | — | 550 | 120 | 40 | 650 | 3600 |
| 8 | A | 600 | — | 550 | 120 | 40 | 650 | 3600 |
| 9 | A | 600 | — | 550 | 120 | 40 | 650 | 3600 |
| 10 | A | 600 | — | 550 | 120 | 40 | 650 | 200 |
| 11 | A | 600 | 360 | 550 | 120 | 40 | 650 | 200 |
| 12 | A | 600 | 360 | 550 | 120 | 40 | 650 | 3600 |
| 13 | A | 600 | 360 | 550 | 120 | 40 | 650 | 3600 |
| 14 | A | 800 | — | 550 | 120 | 40 | 650 | 200 |
| 15 | A | 400 | — | 550 | 120 | 40 | 650 | 200 |
| 16 | A | 600 | — | 300 | 120 | 40 | 650 | 200 |
| 17 | A | 600 | — | 550 | 5 | 40 | 650 | 200 |
| 18 | A | 600 | — | 550 | 120 | 5 | 650 | 200 |
| 19 | A | 600 | — | 550 | 120 | 40 | 800 | 200 |
| 20 | A | 600 | — | 550 | 120 | 40 | 500 | 200 |
| 21 | A | 600 | — | 550 | 120 | 40 | 650 | 5 |
| 22 | A | 600 | — | 550 | 120 | 40 | 650 | 200 |
| 23 | B | 600 | — | 550 | 120 | 40 | 650 | 200 |
| 24 | B | 600 | 360 | 550 | 120 | 40 | 650 | 3600 |
| 25 | C | 570 | — | 550 | 120 | 40 | 630 | 200 |
| 26 | C | 570 | 360 | 550 | 120 | 40 | 630 | 200 |
| 27 | D | 560 | — | 520 | 120 | 40 | 610 | 3600 |
| 28 | D | 560 | — | 520 | 120 | 65 | 610 | 200 |
| 29 | E | 620 | — | 550 | 120 | 40 | 630 | 200 |
| 30 | F | 350 | — | 400 | 120 | 40 | 460 | 200 |
| 31 | G | 660 | — | 550 | 120 | 40 | 700 | 200 |
| 32 | H | 590 | — | 550 | 120 | 65 | 710 | 200 |
| 33 | I | 590 | — | 550 | 120 | 40 | 640 | 200 |
| 34 | 2 | 590 | — | 550 | 120 | 40 | 640 | 200 |
| 35 | K | 590 | — | 550 | 120 | 40 | 640 | 200 |
| 36 | L | 590 | 360 | 550 | 120 | 40 | 640 | 200 |
| 37 | M | 590 | — | 550 | 120 | 40 | 640 | 200 |
| 38 | N | 590 | 360 | 550 | 120 | 40 | 640 | 3600 |
| 39 | O | 608 | 480 | 600 | 120 | 60 | 673 | 220 |
| 40 | O | 608 | 480 | 600 | 120 | 60 | 673 | 220 |
| 41 | P | 581 | — | 500 | 200 | 60 | 638 | 300 |
| 42 | P | 581 | 480 | 500 | 200 | 60 | 638 | 300 |
| 43 | Q | 579 | — | 550 | 240 | 60 | 650 | 500 |
| 44 | Q | 579 | 360 | 550 | 240 | 60 | 650 | 500 |
| 45 | R | 571 | — | 550 | 200 | 60 | 641 | 420 |
| 46 | R | 571 | 460 | 550 | 200 | 60 | 641 | 420 |
| 47 | S | 557 | — | 450 | 300 | 60 | 630 | 220 |
| 48 | S | 557 | 420 | 450 | 300 | 60 | 630 | 220 |
| 49 | T | 542 | — | 400 | 220 | 60 | 622 | 600 |
| 50 | T | 542 | 480 | 400 | 220 | 60 | 622 | 3600 |
| 51 | U | 605 | — | 550 | 240 | 60 | 669 | 180 |
| 52 | U | 605 | 460 | 550 | 240 | 60 | 669 | 3000 |
| 53 | V | 557 | — | 500 | 320 | 60 | 642 | 300 |
| 54 | V | 557 | 400 | 500 | 320 | 60 | 642 | 300 |

| No. | Heat Treatment after Cold Rolling 2 Temperature °C. | Durations | Temperature of Alloying Treatment °C. | Class | Note |
|---|---|---|---|---|---|
| 1 | — | — | — | CR | Example |
| 2 | — | — | — | GI | Example |
| 3 | — | — | 550 | GA | Example |
| 4 | — | — | — | CR | Example |
| 5 | — | — | 540 | GA | Example |
| 6 | — | — | — | CR | Example |
| 7 | — | — | — | CR | Example |
| 8 | — | — | — | GI | Example |
| 9 | — | — | 560 | GA | Example |
| 10 | 650 | 200 | — | CR | Example |
| 11 | 650 | 200 | — | CR | Example |
| 12 | 650 | 200 | — | CR | Example |
| 13 | 650 | 200 | 550 | GA | Example |

TABLE 2-continued

| | | | | | |
|---|---|---|---|---|---|
| 14 | — | — | — | CR | Comparative Example |
| 15 | — | — | — | CR | Comparative Example |
| 16 | — | — | — | CR | Comparative Example |
| 17 | — | — | — | CR | Comparative Example |
| 18 | — | — | — | CR | Comparative Example |
| 19 | — | — | — | CR | Comparative Example |
| 20 | — | — | — | CR | Comparative Example |
| 21 | — | — | — | CR | Comparative Example |
| 22 | — | — | 700 | GA | Comparative Example |
| 23 | — | — | — | CR | Example |
| 24 | — | — | 550 | GA | Example |
| 25 | 620 | 200 | — | GI | Example |
| 26 | — | — | 560 | GA | Example |
| 27 | — | — | — | GI | Example |
| 28 | — | — | 550 | GA | Example |
| 29 | — | — | — | CR | Comparative Example |
| 30 | — | — | — | GI | Comparative Example |
| 31 | — | — | 570 | GA | Comparative Example |
| 32 | — | — | — | GI | Example |
| 33 | — | — | 540 | GA | Example |
| 34 | — | — | — | CR | Example |
| 35 | 630 | 200 | — | GI | Example |
| 36 | — | — | 550 | GA | Example |
| 37 | — | — | — | CR | Example |
| 38 | — | — | 560 | GA | Example |
| 39 | 663 | 180 | — | CR | Example |
| 40 | — | — | — | GI | Example |
| 41 | 628 | 180 | — | CR | Example |
| 42 | 628 | 180 | 535 | GA | Example |
| 43 | — | — | 535 | GA | Example |
| 44 | — | — | 545 | GA | Example |
| 45 | 632 | 150 | — | CR | Example |
| 46 | 632 | 150 | — | GI | Example |
| 47 | — | — | — | GI | Example |
| 48 | — | — | 540 | GA | Example |
| 49 | 610 | 220 | 540 | GA | Example |
| 50 | 610 | 220 | 530 | GA | Example |
| 51 | 651 | 240 | — | CR | Example |
| 52 | 651 | 240 | — | CR | Example |
| 53 | — | — | 525 | GA | Example |
| 54 | — | — | 525 | GA | Example |

* CR: Cold-rolled Steel Sheet (without Coating), GI: Galvanized Steel Sheet (without Alloying Treatment), GA: Galvannealed Steel Sheet

TABLE 3A

| No. | Steel Grade | Thickness t (mm) | Area Fraction of F (%) | Area Fraction of B (%) | Volume Fraction of RA (%) | Mn Content in F (mass %) | Mn Content in F/ Mn Content in Steel Sheet | Mn Content in RA (mass %) | Average Grain Size of RA (μm) | Aspect Ratio of RA | Balance of Microstructure | Note |
|---|---|---|---|---|---|---|---|---|---|---|---|---|
| 1 | A | 2.4 | 62.8 | 0.2 | 15.4 | 3.3 | 0.73 | 6.5 | 0.6 | 1.4 | M + θ | Example |
| 2 | A | 2.4 | 63.7 | 0.2 | 14.7 | 3.2 | 0.71 | 6.4 | 0.7 | 1.5 | M + θ | Example |
| 3 | A | 2.4 | 62.8 | 0.3 | 14.2 | 3.3 | 0.73 | 6.4 | 0.7 | 1.4 | M + θ | Example |
| 4 | A | 2.4 | 68.2 | 0.2 | 20.4 | 2.9 | 0.64 | 6.7 | 0.7 | 1.2 | M + θ | Example |
| 5 | A | 2.4 | 68.7 | 0.3 | 19.8 | 2.9 | 0.64 | 6.6 | 0.8 | 1.3 | M + θ | Example |
| 6 | A | 1.4 | 64.2 | 0.2 | 17.1 | 3.1 | 0.69 | 6.5 | 0.5 | 1.4 | M + θ | Example |
| 7 | A | 2.4 | 67.7 | 0.1 | 21.4 | 2.8 | 0.62 | 6.9 | 0.8 | 1.2 | M + θ | Example |
| 8 | A | 2.4 | 67.9 | 0.2 | 21.5 | 2.9 | 0.64 | 7.0 | 0.7 | 1.3 | M + θ | Example |
| 9 | A | 2.4 | 66.7 | 0.3 | 21.3 | 2.9 | 0.64 | 6.9 | 0.7 | 1.4 | M + θ | Example |
| 10 | A | 2.4 | 67.9 | 0.2 | 19.8 | 3.1 | 0.69 | 6.8 | 0.8 | 1.2 | M + θ | Example |
| 11 | A | 2.4 | 71.2 | 0.2 | 24.5 | 2.7 | 0.60 | 7.2 | 0.9 | 1.2 | M + θ | Example |
| 12 | A | 2.4 | 68.3 | 0.1 | 23.4 | 2.5 | 0.55 | 7.3 | 0.7 | 1.2 | M + θ | Example |
| 13 | A | 2.4 | 68.3 | 0.1 | 23.4 | 2.5 | 0.55 | 7.3 | 0.7 | 1.2 | M + θ | Example |

TABLE 3A-continued

| No. | Steel Grade | Thickness t (mm) | Area Fraction of F (%) | Area Fraction of B (%) | Volume Fraction of RA (%) | Mn Content in F (mass %) | Mn Content in F/ Mn Content in Steel Sheet | Mn Content in RA (mass %) | Average Grain Size of RA (μm) | Aspect Ratio of RA | Balance of Microstructure | Note |
|---|---|---|---|---|---|---|---|---|---|---|---|---|
| 14 | A | 2.4 | 72.8 | 0.2 | 8.8 | 4.1 | 0.91 | 5.3 | 1.1 | 1.8 | M + θ | Comparative Example |
| 15 | A | 2.4 | 73.1 | 0.3 | 7.9 | 4.0 | 0.88 | 5.4 | 1.0 | 1.7 | M + θ | Comparative Example |
| 16 | A | 2.4 | 72.4 | 0.1 | 9.7 | 3.8 | 0.84 | 5.7 | 3.2 | 1.8 | M + θ | Comparative Example |
| 17 | A | 2.4 | 72.4 | 0.1 | 9.7 | 3.8 | 0.84 | 5.6 | 3.2 | 1.8 | M + θ | Comparative Example |
| 18 | A | 3.8 | 72.4 | 0.1 | 9.7 | 3.8 | 0.84 | 5.4 | 3.2 | 1.8 | M + θ | Comparative Example |
| 19 | A | 2.4 | 0 | 0.3 | 1.8 | — | — | 4.9 | 0.7 | 1.7 | M + θ | Comparative Example |
| 20 | A | 2.4 | 88.4 | 0.1 | 1.7 | 4.2 | 0.93 | 4.8 | 0.8 | 1.8 | M + θ | Comparative Example |
| 21 | A | 2.4 | 70.5 | 0.4 | 4.8 | 4.2 | 0.93 | 4.7 | 0.9 | 1.7 | M + θ | Comparative Example |
| 22 | A | 2.4 | 60.2 | 0.2 | 3.2 | 3.4 | 0.75 | 5.6 | 0.7 | 1.8 | M + θ + P | Comparative Example |
| 23 | B | 2.9 | 63.7 | 0.2 | 14.7 | 3.2 | 0.62 | 6.7 | 0.7 | 1.5 | M + θ | Example |
| 24 | B | 2.4 | 66.8 | 0.1 | 24.2 | 3.1 | 0.60 | 7.4 | 0.8 | 1.2 | M + θ | Example |
| 25 | C | 2.4 | 69.4 | 0.2 | 19.8 | 3.3 | 0.68 | 6.4 | 0.7 | 1.9 | M + θ | Example |
| 26 | C | 2.4 | 67.2 | 0.2 | 20.4 | 3.4 | 0.71 | 7.1 | 0.7 | 1.3 | M + θ | Example |
| 27 | D | 2.4 | 38.1 | 0.3 | 35.6 | 4.0 | 0.65 | 8.6 | 0.5 | 1.2 | M + θ | Example |
| 28 | D | 1.4 | 40.4 | 0.3 | 30.4 | 4.6 | 0.75 | 7.4 | 0.7 | 1.4 | M + θ | Example |
| 29 | E | 2.4 | 92.3 | 0.4 | 3.4 | 4.9 | 0.92 | 5.7 | 0.2 | 1.3 | M + θ | Comparative Example |
| 30 | F | 2.4 | 17.3 | 0.2 | 43.4 | 9.8 | 0.86 | 13.1 | 2.6 | 1.7 | M + θ | Comparative Example |
| 31 | G | 2.4 | 64.5 | 9.4 | 8.8 | 2.2 | 0.76 | 3.6 | 2.3 | 1.5 | M + θ + P | Comparative Example |
| 32 | H | 1.4 | 66.9 | 0.2 | 18.4 | 3.5 | 0.73 | 6.9 | 0.5 | 1.2 | M + θ | Example |
| 33 | I | 2.4 | 69.7 | 0.2 | 14.7 | 3.6 | 0.72 | 6.5 | 0.6 | 1.5 | M + θ | Example |
| 34 | J | 2.4 | 68.7 | 0.3 | 15.3 | 3.5 | 0.70 | 6.4 | 0.7 | 1.4 | M + θ | Example |
| 35 | K | 2.9 | 66.4 | 0.1 | 19.2 | 3.7 | 0.67 | 6.9 | 0.8 | 1.3 | M + θ | Example |
| 36 | L | 2.4 | 65.7 | 0.1 | 19.5 | 3.8 | 0.68 | 7.1 | 0.7 | 1.3 | M + θ | Example |
| 37 | M | 2.4 | 70.2 | 0.2 | 15.6 | 3.7 | 0.71 | 6.6 | 0.6 | 1.5 | M + θ | Example |
| 38 | N | 2.4 | 66.4 | 0.1 | 22.9 | 3.1 | 0.62 | 7.3 | 0.8 | 1.2 | M + θ | Example |
| 39 | O | 1.6 | 54.1 | 0.2 | 22.4 | 2.6 | 0.63 | 6.9 | 0.8 | 1.2 | M + θ | Example |
| 40 | O | 1.6 | 58.2 | 0.2 | 18.9 | 2.9 | 0.70 | 6.4 | 0.6 | 1.4 | M + θ | Example |
| 41 | P | 1.6 | 59.1 | 0.1 | 19.2 | 3.6 | 0.69 | 6.9 | 0.6 | 1.4 | M + θ | Example |
| 42 | P | 1.6 | 53.7 | 0.3 | 23.1 | 3.3 | 0.63 | 7.2 | 0.7 | 1.2 | M + θ | Example |
| 43 | Q | 1.6 | 53.2 | 0.1 | 19.8 | 3.7 | 0.72 | 6.5 | 0.6 | 1.5 | M + θ | Example |
| 44 | Q | 1.6 | 59.3 | 0.2 | 21.7 | 3.4 | 0.66 | 6.8 | 0.7 | 1.4 | M + θ | Example |
| 45 | R | 1.6 | 60.7 | 0.2 | 20.5 | 3.3 | 0.67 | 6.7 | 0.8 | 1.3 | M + θ | Example |
| 46 | R | 1.6 | 58.4 | 0.1 | 25.1 | 3.0 | 0.61 | 7.0 | 0.7 | 1.2 | M + θ | Example |
| 47 | S | 1.6 | 58.3 | 0.3 | 21.2 | 4.0 | 0.73 | 6.6 | 0.6 | 1.6 | M + θ | Example |
| 40 | S | 1.6 | 54.2 | 0.1 | 28.4 | 3.7 | 0.67 | 7.2 | 0.6 | 1.5 | M + θ | Example |
| 49 | T | 1.6 | 42.2 | 0.2 | 36.6 | 4.3 | 0.70 | 7.4 | 0.7 | 1.4 | M + θ | Example |
| 50 | T | 1.6 | 45.8 | 0.1 | 42.1 | 4.0 | 0.65 | 7.3 | 0.7 | 1.2 | M + θ | Example |
| 51 | U | 1.6 | 52.7 | 0.2 | 19.2 | 2.5 | 0.64 | 6.2 | 0.7 | 1.4 | M + θ | Example |
| 52 | U | 1.6 | 57.8 | 0.2 | 23.7 | 2.3 | 0.59 | 6.4 | 0.8 | 1.2 | M + θ | Example |
| 53 | V | 1.6 | 62.8 | 0.2 | 16.3 | 3.5 | 0.72 | 6.4 | 0.7 | 1.6 | M + θ | Example |
| 54 | V | 1.6 | 63.5 | 0.1 | 19.1 | 3.0 | 0.61 | 6.8 | 0.7 | 1.4 | M + θ | Example |

F: Ferrite
B: Bainite,
RA: Retained Austenite,
M: Martensite (Including Tempered Martensite),
P: Pearlite,
θ: Cementite

TABLE 3B

| No. | TS (MPa) | EL (%) | TS × EL (MPa · %) | R (mm) | R/t | r Value | LDR | Fatigue Limit (MPa) | Endurance Ratio | Note |
|---|---|---|---|---|---|---|---|---|---|---|
| 1 | 997 | 28.2 | 28115 | 2.25 | 0.94 | 1.01 | 2.15 | 420 | 0.42 | Example |
| 2 | 1000 | 28.3 | 28300 | 2.25 | 0.94 | 0.98 | 2.15 | 425 | 0.43 | Example |
| 3 | 998 | 28.4 | 28343 | 2.25 | 0.94 | 1.00 | 2.15 | 430 | 0.43 | Example |
| 4 | 1001 | 32.4 | 32432 | 2.00 | 0.83 | 0.99 | 2.18 | 440 | 0.44 | Example |
| 5 | 1003 | 32.6 | 32698 | 2.00 | 0.83 | 0.97 | 2.18 | 445 | 0.44 | Example |

TABLE 3B-continued

| No. | TS (MPa) | EL (%) | TS × EL (MPa · %) | R (mm) | R/t | r Value | LDR | Fatigue Limit (MPa) | Endurance Ratio | Note |
|---|---|---|---|---|---|---|---|---|---|---|
| 6 | 1142 | 28.1 | 32090 | 0.75 | 0.54 | 0.96 | 2.18 | 490 | 0.43 | Example |
| 7 | 999 | 34.1 | 34066 | 2.00 | 0.83 | 1.00 | 2.18 | 440 | 0.44 | Example |
| 8 | 1002 | 33.9 | 33968 | 2.00 | 0.83 | 1.01 | 2.18 | 445 | 0.44 | Example |
| 9 | 1000 | 34.2 | 34200 | 2.00 | 0.83 | 1.01 | 2.18 | 440 | 0.44 | Example |
| 10 | 1081 | 31.1 | 33619 | 2.00 | 0.83 | 0.99 | 2.21 | 460 | 0.43 | Example |
| 11 | 1064 | 34.4 | 36602 | 2.00 | 0.83 | 0.98 | 2.21 | 470 | 0.44 | Example |
| 12 | 1058 | 34.8 | 36818 | 1.75 | 0.73 | 0.99 | 2.21 | 480 | 0.45 | Example |
| 13 | 1062 | 34.5 | 36639 | 1.75 | 0.73 | 1.00 | 2.21 | 490 | 0.46 | Example |
| 14 | 895 | 23.5 | 21033 | 3.25 | 1.35 | 0.97 | 2.06 | 360 | 0.40 | Comparative Example |
| 15 | 1098 | 19.9 | 21850 | 3.25 | 1.35 | 0.94 | 2.06 | 440 | 0.40 | Comparative Example |
| 16 | 1202 | 18.4 | 22117 | 4.25 | 1.77 | 0.98 | 2.06 | 440 | 0.37 | Comparative Example |
| 17 | 1198 | 18.4 | 22043 | 4.25 | 1.77 | 0.96 | 2.06 | 430 | 0.36 | Comparative Example |
| 18 | 925 | 24.8 | 22940 | 6.25 | 1.64 | 0.97 | 2.06 | 340 | 0.37 | Comparative Example |
| 19 | 1471 | 11.2 | 16475 | 3.25 | 1.35 | 0.96 | 2.06 | 590 | 0.40 | Comparative Example |
| 20 | 1352 | 12.4 | 16765 | 3.25 | 1.35 | 0.98 | 2.06 | 540 | 0.40 | Comparative Example |
| 21 | 932 | 22.9 | 21343 | 3.00 | 1.25 | 0.96 | 2.09 | 370 | 0.40 | Comparative Example |
| 22 | 802 | 25.6 | 20531 | 3.00 | 1.25 | 0.97 | 2.09 | 320 | 0.40 | Comparative Example |
| 23 | 1002 | 28.4 | 28457 | 2.25 | 0.94 | 0.98 | 2.15 | 425 | 0.42 | Example |
| 24 | 1052 | 35.0 | 36820 | 2.00 | 0.83 | 1.01 | 2.21 | 450 | 0.43 | Example |
| 25 | 1121 | 30.2 | 33854 | 2.00 | 0.83 | 0.98 | 2.18 | 470 | 0.42 | Example |
| 26 | 1024 | 31.7 | 32461 | 2.00 | 0.83 | 1.00 | 2.18 | 430 | 0.42 | Example |
| 27 | 999 | 28.5 | 28472 | 2.00 | 0.83 | 0.98 | 2.18 | 450 | 0.45 | Example |
| 28 | 1131 | 28.0 | 31668 | 1.75 | 1.25 | 0.99 | 2.15 | 480 | 0.42 | Example |
| 29 | 888 | 21.8 | 19358 | 3.25 | 1.35 | 0.98 | 2.09 | 340 | 0.38 | Comparative Example |
| 30 | 1312 | 12.8 | 16794 | 4.50 | 1.88 | 0.96 | 2.06 | 480 | 0.37 | Comparative Example |
| 31 | 1189 | 15.7 | 18667 | 4.25 | 1.77 | 0.97 | 2.12 | 480 | 0.40 | Comparative Example |
| 32 | 1133 | 28.5 | 32291 | 1.50 | 1.07 | 1.01 | 2.18 | 480 | 0.42 | Example |
| 33 | 1008 | 28.1 | 28325 | 2.25 | 0.94 | 1.01 | 2.15 | 440 | 0.44 | Example |
| 34 | 999 | 28.9 | 28871 | 2.25 | 0.94 | 1.02 | 2.15 | 430 | 0.43 | Example |
| 35 | 1077 | 31.8 | 34249 | 2.00 | 0.83 | 1.00 | 2.18 | 480 | 0.45 | Example |
| 36 | 1010 | 32.0 | 32320 | 2.00 | 0.83 | 0.99 | 2.18 | 450 | 0.45 | Example |
| 37 | 999 | 28.6 | 28571 | 2.25 | 0.94 | 0.98 | 2.15 | 440 | 0.44 | Example |
| 38 | 1055 | 34.4 | 36292 | 1.75 | 0.73 | 0.99 | 2.21 | 490 | 0.46 | Example |
| 39 | 992 | 33.8 | 33530 | 1.00 | 0.63 | 1.00 | 2.21 | 460 | 0.46 | Example |
| 40 | 998 | 29.8 | 29740 | 1.25 | 0.78 | 0.99 | 2.18 | 440 | 0.44 | Example |
| 41 | 1044 | 29.7 | 31007 | 1.25 | 0.78 | 1.00 | 2.18 | 450 | 0.43 | Example |
| 42 | 1035 | 32.4 | 33534 | 1.00 | 0.63 | 1.02 | 2.21 | 490 | 0.47 | Example |
| 43 | 1008 | 28.7 | 28930 | 1.50 | 0.94 | 1.01 | 2.15 | 440 | 0.44 | Example |
| 44 | 995 | 32.4 | 32238 | 1.25 | 0.78 | 0.99 | 2.18 | 450 | 0.45 | Example |
| 45 | 992 | 31.8 | 31546 | 1.25 | 0.78 | 0.98 | 2.18 | 460 | 0.46 | Example |
| 46 | 984 | 33.8 | 33259 | 0.75 | 0.47 | 0.99 | 2.21 | 490 | 0.50 | Example |
| 47 | 1042 | 31.2 | 32510 | 1.50 | 0.94 | 1.01 | 2.15 | 440 | 0.42 | Example |
| 48 | 1025 | 33.6 | 34440 | 1.25 | 0.78 | 1.02 | 2.18 | 460 | 0.45 | Example |
| 49 | 1129 | 28.9 | 32628 | 1.25 | 0.78 | 1.01 | 2.18 | 460 | 0.41 | Example |
| 50 | 1112 | 30.8 | 34250 | 0.75 | 0.47 | 0.99 | 2.21 | 490 | 0.44 | Example |
| 51 | 991 | 30.4 | 30126 | 1.25 | 0.78 | 0.99 | 2.18 | 450 | 0.45 | Example |
| 52 | 982 | 31.6 | 31031 | 1.00 | 0.63 | 0.98 | 2.21 | 480 | 0.49 | Example |
| 53 | 1045 | 28.9 | 30201 | 1.50 | 0.94 | 1.02 | 2.15 | 440 | 0.42 | Example |
| 54 | 1031 | 31.4 | 32373 | 1.25 | 0.78 | 0.99 | 2.18 | 460 | 0.45 | Example |

F: Ferrite
B: Bainite,
RA: Retained Austenite,
M: Martensite (Including Tempered Martensite),
P: Pearlite,
θ: Cementite A tensile test was carried out using a JIS No. 5 tensile test piece which was cut out of a steel sheet so that the tensile direction was at a right angle to the rolling direction of the steel sheet in accordance with JIS Z 2241 (2011) and TS (tensile strength) and EL (total elongation) were determined. Here, a case where the relationships TS≥980 Mpa and TS×EL≥24000 MPa·% are satisfied is judged as the case where formability is satisfactory in the present invention.

A bend test was carried out in accordance with the V-block method of JIS Z 2248 (1996). Whether or not there was a crack on the outer surface of the bent part of the test piece was judged using a stereoscopic microscope, and the minimum bend radius of the bent part without a crack was determined as a limit bend radius R. Here, a case where the relationship R/t≤1.5 (t: the thickness of a steel sheet) is satisfied in a 90° V bend test was judged as the case where bendability is satisfactory in the present invention.

An r value was calculated using equation (1) below from $r_L$, $r_D$ and $r_C$ which were determined in accordance with JIS Z 2254 (2008) using JIS No. 5 test pieces according to JIS Z 2201 (1998) which were cut out of the cold-rolled and annealed steel sheet along L direction (the rolling direction), D direction (at an angle of 45° to the rolling direction) and C direction (at a right angle to the rolling direction), respectively.

[Equation 1]

$$r = \frac{r_L + 2r_D + r_C}{4} \quad (1)$$

A cupping test was carried out as a deep drawing test in order to evaluate deep drawability on the basis of a limit drawing ratio (LDR). The cupping test was carried out using a cylindrical punch having a diameter of 33 mmφ and dies having diameters of 44.4 mm, 40.2 mm, 37.8 mm and 37.2 mm respectively for the thicknesses of the steel sheets of 3.8 mm, 2.4 mm, 1.6 mm and 1.4 mm under the conditions that the blank holding force was 1 ton and a forming speed was 1 mm/s. A polyethylene sheet was placed between the sample and the die so that the test was carried out under a highly lubricated condition in order to avoid the influence of the frictional conditions of the samples having various surface conditions such as a state of coating. The blank diameter was varied at intervals of 1 mm, and the ratio of the maximum diameter D among the diameters of the blanks, with which punch stroke was completed without a fracture, divided by a punch diameter d (D/d) was determined as a LDR. Here, a case in which the relationship LDR≥2.12 is satisfied was judged as the case where deep drawability is satisfactory in the present invention.

A plane bending fatigue test was carried out in accordance with JIS Z 2275 (1978) under conditions of reverse vibration (stress ratio of −1) and a frequency of 20 Hz. The stress with which $10^7$ cycles were completed without a fracture in the reverse vibration plane bending fatigue test was determined as a fatigue limit. In addition, the ratio of a fatigue limit divided by a tensile strength TS (endurance ratio) was calculated. Here, a case in which the relationships fatigue limit ≥400 MPa and endurance ratio ≥0.40 were satisfied was judged as the case where fatigue resistance is satisfactory in the present invention.

Any one of the steel sheets of the examples of the present invention had a TS of 980 MPa or more and a TS×EL of 24000 MPa·% or more, which means that a high strength steel sheet having excellent formability was achieved. Moreover, it was also excellent in terms of bendability, deep drawability and fatigue resistance. On the other hand, any one of the comparative examples was poor in at least one of a TS and a TS×EL.

According to the present invention, a high strength steel sheet excellent in terms of formability having a TS of 980 MPa or more and a TS×EL of 24000 MPa·% or more can be manufactured. By applying the high strength steel sheet according to the present invention, for example, to the structural parts of automobiles, it is expected to realize improvement of fuel efficiency due to a reduction of the weight of automobile bodies, which results in a large utility value in industry.

The invention claimed is:

1. A method for manufacturing a high strength steel sheet having excellent formability, the method comprising:
    hot-rolling a steel slab having a chemical composition containing, by mass %, C: 0.03% or more and 0.35% or less, Si: 0.5% or more and 3.0% or less, Mn: 3.8% or more and 10.0% or less, P: 0.1% or less, S: 0.01% or less, N: 0.008% or less and the balance comprising Fe and inevitable impurities;
    coiling the hot-rolled steel sheet at a temperature range of the $Ar_1$ transformation point to the $Ar_1$ transformation point+ (the $Ar_3$ transformation point− the $Ar_1$ transformation point) / 2;
    cooling the coiled steel sheet down to 200° C. or lower;
    heating and holding the cooled steel sheet at a temperature range of the $Ac_1$ transformation point−200° C. to the $Ac_1$ transformation point for 30 minutes or more and 750 minutes or less;
    pickling the heated steel sheet;
    cold-rolling the pickled steel sheet under the condition that the rolling reduction is 20% or more; and
    heating and holding the cold-rolled steel sheet at a temperature range of the $Ac_1$ transformation point to the $Ac_1$ transformation point+ (the $Ac_3$ transformation point− the $Ac_1$ transformation point) / 2 for 30 seconds or more and 360 minutes or less,
    wherein the steel sheet includes a microstructure including: in terms of area fraction, 30.0% or more and 80.0% or less of ferrite, in which the ratio of the amount of Mn (mass %) in the ferrite divided by the amount of Mn (mass %) in the steel sheet is 0.20 or more and 0.80 or less; in terms of volume fraction, 10.0% or more of retained austenite, in which the amount of Mn in the retained austenite is 6.0% or more and 11.0% or less, and in which the average grain size of the retained austenite is 0.1 μm or more and 2.0 μm or less; and, in terms of area fraction, 3.0% or less of bainite, and an aspect ratio of the retained austenite is 2.0 or less.

2. A method for manufacturing a high strength steel sheet having excellent formability, the method comprising:
    hot-rolling a steel slab having a chemical composition containing, by mass %, C: 0.03% or more and 0.35% or less, Si: 0.5% or more and 3.0% or less, Mn: 3.8% or more and 10.0% or less, P: 0.1% or less, S: 0.01% or less, N: 0.008% or less and the balance comprising Fe and inevitable impurities;
    coiling the hot-rolled steel sheet at a temperature range of the $Ar_1$ transformation point to the $Ar_1$ transformation point+ (the $Ar_3$ transformation point− the $Ar_1$ transformation point) / 2,
    holding the coiled steel sheet at a temperature range of the $Ar_1$ transformation point to the $Ar_1$ transformation point+ (the $Ar_3$ transformation point− the $Ar_1$ transformation point) / 2 for 5 hours or more and 12 hours or less;
    cooling the coiled steel sheet down to 200° C. or lower;
    heating and holding the cooled steel sheet at a temperature range of the $Ac_1$ transformation point−200° C. to the $Ac_1$ transformation point for 30 minutes or more and 750 minutes or less;
    pickling the heated steel sheet;
    cold-rolling the pickled steel sheet under the condition that the rolling reduction is 20% or more; and
    heating and holding the cold-rolled steel sheet at a temperature range of the $Ac_1$ transformation point to the $Ac_1$ transformation point+(the $Ac_3$ transformation point−the $Ac_1$ transformation point) / 2 for 30 seconds or more and 360 minutes or less,
    wherein the steel sheet includes a microstructure including: in terms of area fraction, 30.0% or more and 80.0% or less of ferrite, in which the ratio of the amount of Mn (mass %) in the ferrite divided by the amount of Mn (mass %) in the steel sheet is 0.20 or more and 0.80 or less; in terms of volume fraction, 10.0% or more of retained austenite, in which the amount of Mn in the retained austenite is 6.0% or more and 11.0% or less, and in which the average grain size of the retained austenite is 0.1 μm or more and 2.0 μm or less; and, in terms of area fraction, 3.0% or less of bainite, and an aspect ratio of the retained austenite is 2.0 or less.

3. A method for manufacturing a high strength steel sheet having excellent formability, the method comprising:
   hot-rolling a steel slab having a chemical composition containing, by mass %, C: 0.03% or more and 0.35% or less, Si: 0.5% or more and 3.0% or less, Mn: 3.8% or more and 10.0% or less, P: 0.1% or less, S: 0.01% or less, N: 0.008% or less and the balance comprising Fe and inevitable impurities;
   coiling the hot-rolled steel sheet at a temperature range of the $Ar_1$ transformation point to the $Ar_1$ transformation point+ (the $Ar_3$ transformation point− the $Ar_1$ transformation point) / 2;
   optionally further holding the coiled steel sheet at a temperature range of the $Ar_1$ transformation point to the $Ar_1$ transformation point+ (the $Ar_3$ transformation point− the $Ar_1$ transformation point) / 2 for 5 hours or more and 12 hours or less;
   cooling the coiled steel sheet down to 200° C. or lower;
   heating and holding the cooled steel sheet at a temperature range of the $Ac_1$ transformation point−200° C. to the $Ac_1$ transformation point for 30 minutes or more and 750 minutes or less;
   pickling the heated steel sheet;
   cold-rolling the pickled steel sheet under the condition that the rolling reduction is 20% or more;
   heating and holding the cold-rolled steel sheet at a temperature range of the $Ac_1$ transformation point to the $Ac_1$ transformation point+ (the $Ac_3$ transformation point− the $Ac_1$ transformation point) / 2 for 30 seconds or more and 360 minutes or less;
   cooling the heated steel sheet down to a temperature of 200° C. or lower; and
   heating and holding the cooled steel sheet at a temperature range of the $Ac_1$ transformation point to the $Ac_1$ transformation point+ (the $Ac_3$ transformation point− the $Ac_1$ transformation point) / 2 for 10 seconds or more,
   wherein the steel sheet includes a microstructure including: in terms of area fraction, 30.0% or more and 80.0% or less of ferrite, in which the ratio of the amount of Mn (mass %) in the ferrite divided by the amount of Mn (mass %) in the steel sheet is 0.20 or more and 0.80 or less; in terms of volume fraction, 10.0% or more of retained austenite, in which the amount of Mn in the retained austenite is 6.0% or more and 11.0% or less, and in which the average grain size of the retained austenite is 0.1 μm or more and 2.0 μm or less; and, in terms of area fraction, 3.0% or less of bainite, and an aspect ratio of the retained austenite is 2.0 or less.

4. A method for manufacturing a high strength steel sheet having excellent formability, the method further comprising performing hot-dip galvanizing treatment on the high strength steel sheet manufactured by the method according to claim 1.

5. The method for manufacturing a high strength steel sheet having excellent formability according to claim 4, the method further comprising performing alloying treatment at a temperature range of 470° C. to 600° C. on the galvanized layer formed by the hot-dip galvanizing treatment.

6. The method for manufacturing a high strength steel sheet having excellent formability according to claim 1, the steel slab having the chemical composition further containing, by mass %, Al: 0.01% or more and 2.5% or less.

7. The method for manufacturing a high strength steel sheet having excellent formability according to claim 1, the steel slab having the chemical composition further containing, by mass %, at least one chemical element selected from Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

8. The method for manufacturing a high strength steel sheet having excellent formability according to claim 1, the steel slab having the chemical composition further containing, by mass %, at least one chemical element selected from Ti: 0.01% or more and 0.1% or less, Nb: 0.01% or more and 0.1% or less, and B: 0.0003% or more and 0.0050% or less.

9. The method for manufacturing a high strength steel sheet having excellent formability according to claim 1, the steel slab having the chemical composition further containing, by mass %, at least one chemical element selected from Ca: 0.001% or more and 0.005% or less and REM: 0.001% or more and 0.005% or less.

10. The method for manufacturing a high strength steel sheet having excellent formability according to claim 1, the steel slab having the chemical composition further containing, by mass %, Mg: 0.0005% or more and 0.0100% or less.

11. The method for manufacturing a high strength steel sheet having excellent formability according to claim 1, the steel slab having the chemical composition further containing, by mass %, Ta: 0.0010% or more and 0.1000% or less.

12. The method for manufacturing a high strength steel sheet having excellent formability according to claim 1, the steel slab having the chemical composition further containing, by mass %, Sn: 0.0020% or more and 0.2000% or less and/or Sb: 0.0020% or more and 0.2000% or less.

13. A high strength steel sheet having excellent formability, the steel sheet having:
   a chemical composition containing, by mass %, C: 0.03% or more and 0.35% or less, Si: 0.5% or more and 3.0% or less, Mn: 3.8% or more and 10.0% or less, P: 0.1% or less, S: 0.01% or less, N: 0.008% or less and the balance comprising Fe and inevitable impurities; and
   a microstructure including,
   in terms of area fraction, 30.0% or more and 80.0% or less of ferrite,
   wherein the ratio of the amount of Mn (mass %) in the ferrite divided by the amount of Mn (mass %) in the steel sheet is 0.20 or more and 0.80 or less, and
   in terms of volume fraction, 10.0% or more of retained austenite,
   wherein the amount of Mn in the retained austenite is 6.0 mass % or more and 11.0 mass % or less,
   in which the average grain size of the retained austenite is 0.1 μm or more and 2.0 μm or less, and
   in terms of area fraction, 3.0% or less of bainite,
   wherein the aspect ratio of retained austenite is 2.0 or less.

14. The high strength steel sheet having excellent formability according to claim 13, the steel sheet having the chemical composition further containing, by mass %, Al: 0.01% or more and 2.5% or less.

15. The high strength steel sheet having excellent formability according to claim 13, the steel sheet having the chemical composition further containing, by mass %, at least one chemical element selected from Cr: 0.05% or more and 1.0% or less, V: 0.005% or more and 0.5% or less, Mo: 0.005% or more and 0.5% or less, Ni: 0.05% or more and 1.0% or less, and Cu: 0.05% or more and 1.0% or less.

16. The high strength steel sheet having excellent formability according to claim 13, the steel sheet having the chemical composition further containing, by mass %, at least one chemical element selected from Ti: 0.01% or more and 0.1% or less, Nb: 0.01% or more and 0.1% or less, and B: 0.0003% or more and 0.0050% or less.

17. The high strength steel sheet having excellent formability according to claim 13, the steel sheet having the chemical composition further containing, by mass %, at least one chemical element selected from Ca: 0.001% or more and 0.005% or less and REM: 0.001% or more and 0.005% or less.

18. The high strength steel sheet having excellent formability according to claim 13, the steel sheet having the chemical composition further containing, by mass %, Mg: 0.0005% or more and 0.0100% or less.

19. The high strength steel sheet having excellent formability according to claim 13, the steel sheet having the chemical composition further containing, by mass %, Ta: 0.0010% or more and 0.1000% or less.

20. The high strength steel sheet having excellent formability according to claim 13, the steel sheet having the chemical composition further containing, by mass %, Sn: 0.0020% or more and 0.2000% or less and/or Sb: 0.0020% or more and 0.2000% or less.

* * * * *